United States Patent [19]
Johnson et al.

[11] Patent Number: 5,316,863
[45] Date of Patent: May 31, 1994

[54] SELF-BRAZING ALUMINUM LAMINATED STRUCTURE

[75] Inventors: John J. Johnson, Batavia, Ill.; Roland S. Timsit, Kingston, Canada

[73] Assignee: Alcan International Limited, Montreal, Canada

[21] Appl. No.: 885,125

[22] Filed: May 18, 1992

[51] Int. Cl.$^5$ .............................. B22F 7/04
[52] U.S. Cl. .................... 428/548; 148/513; 428/552; 428/554; 428/558; 228/198
[58] Field of Search .............. 29/157.3 R, 157.3 V; 72/363; 148/6.3, 23, 26; 156/630; 228/116, 118, 183, 198, 206; 419/3, 6; 428/208, 554, 559, 548

[56] References Cited

U.S. PATENT DOCUMENTS

| | | | |
|---|---|---|---|
| 936,389 | 10/1909 | Wadsworth . | |
| 2,987,816 | 6/1961 | Noland | 29/493 |
| 3,587,284 | 6/1971 | Lemelson | 72/363 |
| 3,650,005 | 3/1972 | Kamiya et al. | 29/157.3 V |
| 3,970,237 | 7/1976 | Dockus | 228/208 |
| 4,034,454 | 7/1977 | Galasso et al. | 428/576 |
| 4,220,484 | 9/1980 | Prohaska et al. | 148/6.3 |
| 4,732,311 | 3/1988 | Hasegawa et al. | 228/138 |
| 4,804,132 | 2/1989 | DiFrancesco | 228/115 |
| 5,100,048 | 3/1992 | Timsit | 228/198 |
| 5,190,596 | 3/1993 | Timsit | 148/23 |

FOREIGN PATENT DOCUMENTS

| | | |
|---|---|---|
| 959343 | 3/1957 | Fed. Rep. of Germany . |
| 159726 | 11/1969 | Hungary . |
| WO91/12108 | 8/1991 | PCT Int'l Appl. . |
| 985281 | 3/1965 | United Kingdom . |
| 1163767 | 9/1969 | United Kingdom . |

*Primary Examiner*—Donald P. Walsh
*Assistant Examiner*—John N. Greaves
*Attorney, Agent, or Firm*—Cooper & Dunham

[57] ABSTRACT

A novel self-brazing aluminum laminated structure is described, as well as a method of making the laminated structure and a brazed product produced therefrom. The laminated structure consists of a thin layer of a powder mixture consisting of eutectic-forming metal powder and a flux powder sandwiched between an aluminum alloy sheet and an aluminum foil. The laminate is fabricated by roll bonding to provide adequate adhesion of the foil to the underlying sheet through and around the powder layer. This can be done by arranging the powder layer into clusters of powder with spaces therebetween so that roll bonding between the foil and the aluminum alloy substrate takes place by way of direct metal contact between the clusters. These clusters may be created by the method of applying the powder, e.g. silk screen, or by providing depressions in the surface of the substrate by a process of roughening or of embossing within which clusters of the powder are located.

32 Claims, 2 Drawing Sheets

SELF-BRAZING ALUMINUM LAMINATED STRUCTURE

BACKGROUND OF THE INVENTION

This invention relates to a novel self-brazing aluminum laminated structure as well as to a method of making the laminated structure and a brazed product.

It is common practice to join aluminum components by disposing an aluminum brazing alloy between or adjacent the component surfaces to be joined, and heating the brazing alloy and the joining surfaces in appropriately assembled fashion to a temperature (brazing temperature) at which the brazing alloy melts while the components remain unmelted. Upon subsequent cooling, the brazing alloy forms a filet or joint that bonds the joining surfaces of the components. For assured selective melting of only the brazing alloy in the heating step, it is commonly preferred that the melting point of the brazing alloy be at least 30° to 40° C. lower than that of the metal of the components. An example of a typical aluminum brazing alloy is an aluminum-silicon eutectic composition, which starts to melt at about 577° C.

Wadsworth, U.S. Pat. No. 936,389, issued Oct. 12, 1909 describes a process for modifying the surface of a metal substrate by making projections or depressions in the surface and during this operation adding finely divided material such as carbon, vanadium, nickel, zinc, etc. which is incorporated or alloyed with the surface, which, because the substrate metal is quite soft and plastic, will be forced into the metal and thoroughly mixed and thus quickly and readily combine or alloy therewith. He also teaches that after the incorporation of the particles into the surface bearing the projections and depressions, the shape must be sent to one or more smoothing passes to reduce the area of the marked surface, thereby resulting in a substantial densification of the surface and imparting improved corrosion and abrasion resistance.

DiFrancesco, U.S. Pat. No. 5,083,697 and W091/12108, published Aug. 22, 1991, describes a method of joining metal surfaces by elasto-plastic deformation in which at least one of the surfaces bears metallized particles which contain a core of hard material which is harder than the materials to be joined so that as the surfaces are pressed together there is elasto-plastic deformation of the surfaces in contact with the hard particles which will lead to diffusion bonding of the surfaces. Among the materials that may be bonded are mentioned aluminum, silicon, copper, lead, tin and their alloys.

Gal, U.S. Pat. No. 4,601,089, issued Jul. 22, 1986, refers to a procedure in which zinc powder is rolled into an aluminum surface whereby the zinc-coated surface becomes solderable. In accordance with the Gal procedure, one surface of the aluminum must be fully coated with the zinc in a thickness which enables it to be soldered without burning through the layer. This requires a thickness in the order of 1/10 mm.

Mori, U.S. Pat. No. 4,365,995 relates to the production of powder layers 10 to 20 μm in thickness, consisting largely of aluminum, onto steel surfaces by rolling. The rolled in powder is sintered at 280°-520° C. and the purpose appears to be for modifying the surface.

Morishita et al, U.S. Pat. No. 4,848,646 describes an electrochemical technique for depositing zinc and nickel to generate a solderable surface on aluminum.

It is the object of the present invention to produce a brazing sheet in the form of a laminate in which the brazing sheet carries both a brazing flux and a metal capable of forming in situ a eutectic alloy with an aluminum substrate when the sheet is heated.

SUMMARY OF THE INVENTION

According to the present invention it has now been discovered that a highly useful brazing sheet can be produced in which an aluminum or aluminum alloy substrate carries on one or both surfaces thereof particles of a metal capable of forming in situ a eutectic alloy with the substrate when the sheet is heated. The eutectic forming metal particles are preferably mixed with particles of a flux of melting point lower than the melting point of the eutectic and capable of removing an oxide layer from the surface of the substrate material. The eutectic forming metal particles and flux particles on the surface of the substrate are preferably covered by a metal foil which is then bonded to the substrate such that the particles are held between the outer foil and the substrate. This laminate structure has the advantage that it is self-brazing in that it is ready for brazing without any application of brazing flux. The surface foil provides the advantage that processing equipment such as cutting, stamping or forming tools encounter only the metal foil surface and not the particulates.

The eutectic forming metal particles are typically of powder consistency and may consist of Si, Cu, Ge or Zn, but Si is preferred. They typically have particle sizes in the range from 1 to 1,000 μm, but the preferred range is 10 to 60 μm.

The flux is also preferably used in a powder consistency and the eutectic forming metal powder and the flux powder are usually present in a metal:flux weight ratio range of 1:10 to 10:1, with a range of 1:1 to 1:4 being preferred.

The flux component of the coating mixture may be any material capable of removing oxide layer and which melts up to 600° C., and higher if the metal for forming the eutectic has a higher melting point. As herein used, potassium fluoroaluminate refers to materials containing the elements potassium, aluminium, and fluorine, in such proportions that compounds such as KF, $AlF_3$, $KAlF_4$, $K_2AlF_5$, $K_3AlF_6$ either singly, doubly or in combination are present. The composition can be expressed in terms of the elemental composition of 20 to 45% K; 10 to 25% Al, and 45 to 60% F; or in terms of the concentration of the compounds KF and $AlF_3$, as 40 to 70% $AlF_3$ and 30 to 70% KF. Such fluxes have been described among others in U.K. Patent 1,055,914 for a combination containing 53–55% $AlF_3$ and 45–47% KF; and in U.S. Pat. No. 3,951,328 for a combination of 45–65% $AlF_3$ and 35 to 55% KF, which provides for a mixture of $K_3AlF_6$ and $KAlF_4$ to give mixtures which melt around 560° C. Other potassium fluoroaluminates having the desired flux properties are mixtures of 65.6 to 99.9% $KAlF_4$ and 34.4 to 0.1% $K_3AlF_6$. Yet another is described in European patent publication EP 0295541 for a mixture prepared from 31.5 to 56.2% KF and 68.5 to 43.8% $AlF_3$. Still another is described in U.S. Pat. No. 4,579,605, this being for a flux comprising one member chosen from the group $K_2AlF_5$ and $K_2AlF_5$.-$H_2O$, the remainder being KF. A commercially sold potassium fluoroaluminate is known as Nocolok®. Other suitable potassium fluoroaluminates are $KAlF_4$, $K_2AlF_5$, $K_3AlF_6$ and their mixtures; and potassium fluoroaluminate mixed with one or more of cesium chloride, rubidium chloride, lithium fluoride, cesium fluoride and other alkali halide salts to reduce the melting point of the flux. Other known aluminum brazing fluxes are: mixtures of alkali and alkaline earth chlorides and fluorides, ammonium chloride, ammonium fluoride, potassium acid fluoride ($KHF_2$), sodium acid fluoride ($NaHF_2$), ammonium acid fluoride ($NH_4HF_2$), zinc chloride, mixtures of zinc chloride, potassium acid fluoride and ammonium chloride and potassium fluoro-zirconate ($K_2ZrF_6$).

The laminates of the present invention can be produced by simply depositing a powder of the eutectic forming metal on an aluminum alloy substrate sheet and rolling the sheet covered with powder to form a dispersed layer of the particles on the substrate surface. The powder may be deposited on one or both sides of the substrate sheet. In the cases of some harder substrate alloys, it may be necessary to prepare the substrate by a mechanical treatment, such as brushing, or by a chemical cleaning operation.

Another way of making the laminate is to deposit the powder containing both the eutectic forming metal and a flux material on the surface of the substrate sheet, and rolling the sheet covered with the powder to form a dispersed layer of particles of metal and flux on the substrate surface. The particles of metal, or of metal and flux, may be deposited onto the surface using a variety of techniques such as electrostatic spraying, brushing on or deposition from a slurry consisting of the eutectic forming powders and flux powders mixed with water or a volatile liquid such as alcohol.

There is yet another process to lock into the surface of the substrate the powder of eutectic forming metal and the flux. This process requires a mechanical preparation of the substrate to provide a textured surface comprising grooves, deep enough to hold some of the brazing mixture, and yet leave the uppermost portion of the groove empty. The mixture is applied to the prepared surface, and some of it is retained in the bottom of the grooves. In the subsequent rolling operation, the upper walls of the grooves spread or are folded to cover the powder in the bottom of the groove, and thereby to lock it into place.

In another procedure, the powder may be sprayed onto the substrate or core sheet with a binder, with the covering aluminum layer being attached to the coated substrate alloy in part by the adhesion of the binder. With this procedure, the adhesive material should volatilize before the formation of the eutectic liquid, and the covering aluminum layer may need to carry micro perforations to allow volatilization of the binder.

According to a preferred embodiment, the powder mixture may also include a binder component. This binder may be selected from a variety of binder materials which are capable of volatilizing below the melting point of the flux and the eutectic alloy. Examples of suitable binder materials include a mixture polyethylmethylacrylate and butylacrylate or 1-(2-methoxy-1-methyloxy)-2-propanol and propylene glycol as the carrier, or 2-methyl 2, 4-pentanediol.

The amount of powder mixture applied to the surface is usually less than 130 g/m$^2$, with a range of about 30 to 100 g/m$^2$ being preferred. When a binder is included in the mixture, as much as 130 g/m$^2$ can be applied. However, a mixture without a binder should not be applied in an amount above 100 g/m$^2$. It has been found to be particularly preferred to apply the coating mixture in an amount to provide 20 to 30 g/m$^2$ of the flux component on the surface. It is also preferred that the ratio of binder to eutectic forming metallic be between 0.5 to 6:1 on a weight/weight basis.

A particularly effective way of making the laminate is to cover the dry powder mixture of eutectic forming metal, and optionally the flux, with a layer of aluminum sheet or foil of the appropriate thickness before rolling to cover the entire coated sheet area. When foil is used as the cover, the thickness is typically between 15 and 150 microns, but thicker sheet may be used if the laminate is subjected to a major reduction in thickness during rolling. The laminate is then prepared by rolling, preferably a combination of hot and cold rolling. If the laminate is much thicker than the final desired rolled product, the thickness of the covering aluminum layer that is applied must be greater than the maximum 150 micron thickness available in foil form. In this case, a sheet of aluminum or aluminum alloy or clad aluminum alloy must be used to cover the powdery layer of the eutectic forming metal and the flux.

The layer of aluminum used to cover the powder on the substrate, which will henceforth be termed the "covering aluminum layer", consists of commercially pure aluminum or aluminum alloy, or a core of any aluminum alloy clad by a layer of any aluminum alloy such that the concentration of magnesium present in the metal, alloy or cladding alloy is such as to provide an amount of less than 0.1% by weight of magnesium at the point of brazing at the time of brazing. Although it is not essential for the operation of the invention, it is preferably to use both the substrate and the covering aluminum layer in an annealed condition which is soft enough to embed the powder when the laminate is rolled. This annealed condition is called the "0" temper condition.

During the rolling sequence, hot rolling is preferably preceded by preheating the composite sheet/foil material in a furnace at a selected temperature ranging from about 200° to 500° C. This preheating also acts to remove residual liquid films if the powder is deposited from a slurry. The preferred hot rolling temperature is in the range 200°–500° C. A particularly preferred temperature is between 200° and 400° C. The hot rolling is carried out using one pass at a reduction in the range of 20 to 80%, preferably 40 to 60%. After hot rolling, the laminate is allowed to cool, preferably to a temperature below about 100° C., and is then subjected to one cold roll pass. The cold rolling may be performed with a reduction of 30 to 80%, preferably 40 to 60%. The one cold rolling pass yields a significant increase in the adhesion of the foil to the substrate over the adhesion achieved by the first hot rolling pass. Multiple cold rolling passes may be used to further increase the adhesion.

With the above procedure, it is generally beneficial to mechanically roughen or chemically clean the sheet and covering aluminum layer prior to powder deposition as this appears to result in marginally stronger foil adhesion after rolling. The surface coverage of the eutectic forming metal powder, e.g. silicon, and the thickness of the covering aluminum layer in the laminate are intimately related and depend on the quantity of eutectic liquid required for brazing. The quantity of silicon deposited in the sheet/foil assembly before hot-rolling must take account of the silicon dispersion and covering metal layer thinning that ensues hot and cold rolling. Thus, if the covering metal layer thickness is reduced to 5 μm following cold rolling, the minimum quantity of dispersed silicon powder in the thinned laminate should not be smaller than approximately 3.9 g/m$^2$ to convert the entire covering metal layer to an Si/Al eutectic liquid with a composition of 12.6 wt. % silicon and 87.4 wt. % Al. In this particular example, part of the silicon present is also consumed in converting the aluminum alloy substrate sheet to a depth of approximately 5 μm to a liquid of eutectic composition.

Because the adhesion of the covering metal layer to the substrate alloy in the laminated structure must be sufficiently large to preclude delamination during handling, steps may be taken to enhance adhesion. In one procedure, the laminate prepared as described above is subjected to a number of additional cold rolling passes with a reduction of 20–50% in each to increase adhesion. A further increase in adhesion may be achieved by annealing the laminate subsequent to cold rolling.

Another option for preparing the laminate is to arrange the silicon and flux particles in arrays of clustered particles in the laminate. For instance, shallow depressions may be formed either in the substrate alloy surface or in the foil to define regions where the deposited powder particles can accumulate or cluster. The remaining surface (or land) area between the depressions then define regions where the covering metal layer and substrate alloy are directly bonded together by rolling. The shallow depressions may be formed by a variety of techniques such as lithography, chemical etching or mechanical embossing using an appropriate template. These depressions and lands must be positioned such that the silicon/flux mixture deposited in the depressions can react with both the covering aluminum layer and the top portion of the substrate to form a eutectic liquid during brazing. Preferably the depressions and lands are arranged in a fine checkerboard pattern or as a series of grooves.

In another procedure, an array of elevated land areas may be generated on the substrate alloy surface that can then be bonded with the covering aluminum layer during rolling. The height of these land areas must exceed the average thickness of the powder coating to provide an adequate area for mechanical contact with the covering aluminum layer. The elevated areas may be formed by conventional lithographic or chemical etching techniques, or by mechanical embossing with a flat template or a textured roll.

In still another procedure, the powders may be applied to an unembossed substrate alloy surface by means of a silk screen to localize the powder in clusters over selected areas on the core sheet. The areas between the clusters then define the regions of bonding between the covering layer and core alloy during rolling.

Adhesion of the covering aluminum layer to the core alloy may be enhanced by addition of a soft metal powder such as aluminum or zinc to the silicon/flux mixture. Enhanced adhesion may arise from bridging of the covering aluminum layer and core alloy surfaces by the soft metal additives during rolling. Other soft metal additives such as Sn or In may also act to enhance adhesion.

The contents of the laminate may be modified so as to yield, in reaction with conventional or specially-designed aluminum alloys, joined parts with superior strength and formability properties, superior heat treatability, superior corrosion resistance, superior wear resistance, superior weldability, superior thermal conductivity, superior liquid-phase fluidity and better anodized surface properties than the parent alloys.

For example, the use of a 1% Zn 99% Al alloy, such as AA7072 aluminum alloy as covering aluminum layer in the laminate would enhance the corrosion resistance of a brazed assembly. If neither the core nor the covering aluminum layer of the laminate contains zinc, protection against corrosion would be achieved by the addition of zinc powder to the Si/flux mixture in the composite material. In this case, as in the example where the covering aluminum layer consists of AA7072, corrosion resistance of the brazed joint is enhanced through diffusion of the zinc into the joined parts during brazing and the subsequent formation of a sacrificial corrosion layer. The addition of Sn or Cu powder to the Si/flux mixture may similarly enhance corrosion resistance.

In another extension of laminate function, the addition of copper powder in the powder mixture could lead to sufficient Cu diffusion into the joints, and more generally through the core alloy of the laminate during brazing, to enhance the mechanical strength of the core alloy. The core alloy could be a common aluminum alloy or an alloy designed to become heat-treatable after reacting with the diffused copper. Similarly, additions of Fe, Mn, Ni, excess Si, and Zn powders to the powder mixture, either separately or in combination with each other, could generate superior mechanical strength, superior elevated temperature strength and/or superior heat treatability of the joined aluminum parts. Addition of elements such as Cu, Zn, Ni, Co and Mn to the powder mixture could yield superior formability properties to the brazed aluminum parts. Additions of Bi and Sr may enhance the wettability properties of the eutectic liquid to the parent alloy during brazing and may also modify solid constituents in the solidified joints and/or in the core alloys after brazing. All the superior properties described above would be achieved by diffusion of metal or metal-alloy additives into the brazed components and their subsequent reaction with elements or precipitates in the core alloy of the laminate. Diffusion may be accomplished either during brazing or by an appropriate heat treatment following brazing.

Other superior properties may be achieved in the brazed assembly by the presence of selected powder additives in the powder mixture entrapped in the laminate. Additions of Ni, Sn, Zn, Pb, Bi and Sb powder may improve the machinability of the brazed components. The corrosion resistance of the brazed components may be enhanced by the additions of Mn, Cr, Sb and V powder. Additions of Zn may yield superior finish following an anodizing treatment. Superior finish following anodizing may also be achieved by adding an appropriate modifier such as Be or Sr to the brazing flux that would react with the core-alloy surface to minimize the dimensions of solid constituent particles. A selected anodic colour may be imparted to the brazed assembly by the presence of a selected additive in the brazing mixture (e.g. excess Si would yield a grey colour). Addition of Ti or B powder may lead to grain refining of the solidified brazement. Additions of powders of elements such as Cu may lead to sufficient modification of the core materials by diffusion to enhance the thermal conductivity properties of that material. Thermal conductivity may also be enhanced by the diffusion of elements capable of reacting with the core alloy to precipitate selected elements (e.g. Mn, Fe) out of solution. The weldability of the brazed assembly may be enhanced by additions of Be and excess Si to the brazing mixture. It is again emphasized that the superior properties described above would be achieved by diffusion either during brazing or during an appropriate thermal treatment following brazing. The aluminum parts may be prepared either from conventional aluminum alloys or from alloys designed specifically to promote the property-enhancement sought during heat-treatment.

Other superior material properties such as enhanced wear resistance in a brazed assembly may be obtained by modifying the brazing cycle and/or by the additions of metallic, refractory, oxide and ceramic powders to the powder mixture in the laminate. For example, the addition of SiC or WC particles to the powder mixture in the laminate will increase the wear resistance of the joined part because the SiC and WC particulate material remains embedded in the surface of the joined parts after cooling, thus increasing surface hardness. Superior wear properties may also be obtained by the addition of metallic powders such as Be and NiAl, ceramics powders such as BN and $Al_2O_3$, metal borides, metal silicides, metal carbides and metal oxides. Similarly, the addition of Sn powder to the powder mixture in the laminate will impart superior bearing properties to the joined surfaces. As mentioned earlier, for the purpose of obtaining superior bearing or wear resistance properties, the parts to be brazed may be prepared from conventional or from specially-designed aluminum alloys. The specially-designed aluminum alloys cover those aluminum alloys comprising combinations of elements that would promote generation of the sought surface properties.

The present invention also relates to a brazing process and brazed assembly based on the self-brazing aluminum laminated sheet structure of the invention. Thus, the sheet structure of this invention is placed in contact with another metallic part which may, for example, be made of copper, brass, stainless steel, mild steel, etc. and the temperature of the parts is raised to a temperature higher than both the melting point of the flux and the eutectic-forming point of the eutectic-forming metal, e.g. silicon, with aluminum to form a brazement. For instance, it has been found that in a dry nitrogen atmosphere and at a temperature higher than both the melting point of the flux and the eutectic-formation point with aluminum of the silicon, the flux removes the oxide layer from the covering aluminum layer surface in contact with the powder and allows conversion of the covering aluminum layer to the eutectic liquid. This conversion is achieved through in situ diffusion of the metal component of the powder into the covering aluminum layer. In a brazing application where it is desired to form a metallurgical bond between an aluminum part and the laminated surface, excess molten flux generated in the laminate flows through the eutectic liquid and dissolves the surface oxide film on the aluminum part. This oxide removal allows the eutectic liquid generated in the laminate to wet the part and form a brazement on cooling. Because the metal/flux mixture deposited in the laminate reacts not only with the foil but also with the aluminum core sheet, successful brazing depends critically on the availability of a sufficiently large quantity of flux and eutectic forming metal so that consumption of this metal by the core alloy does not impede full conversion of the covering aluminum layer.

BRIEF DESCRIPTION OF THE DRAWINGS

Certain preferred embodiments of this invention are illustrated by the following drawings in which:

As shown in FIG. 1, a substrate aluminum alloy 10 is uncoiled from roll 11 and is subjected to surface preparation. This may be accomplished in a number of ways. Two alternatives are shown. In the first alternative, the substrate passes through a scratch brush 12, to provide mechanical roughening of the substrate. In the second alternative, the substrate is embossed into the desired pattern of depressions by means of the embossing roll 13.

Figure 1:
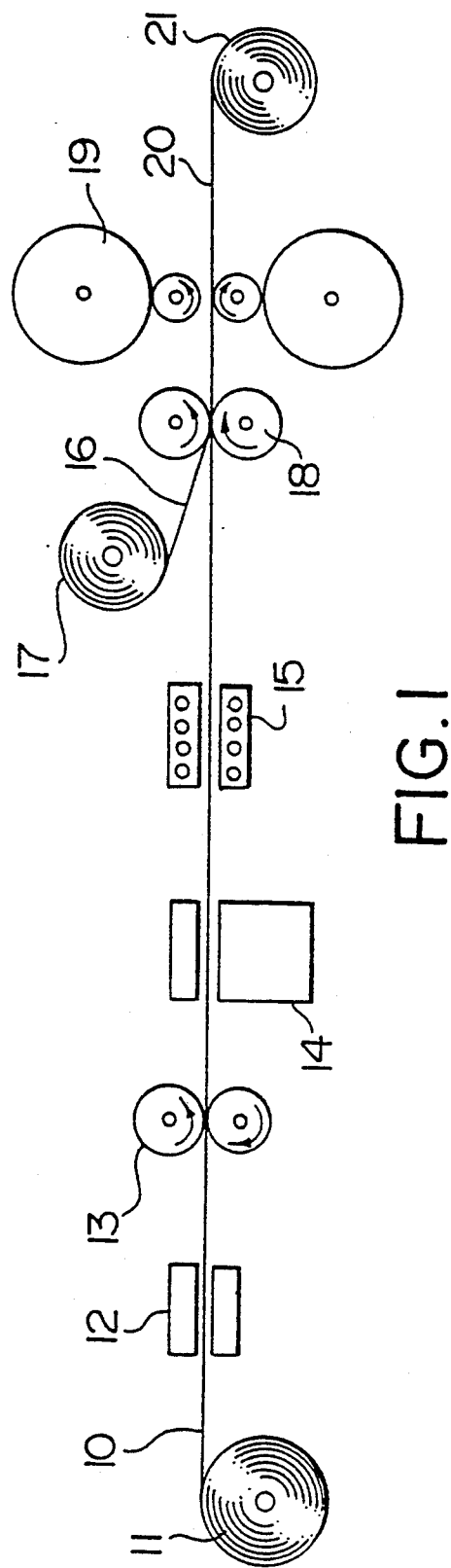
FIG. 1 is a flow sheet of a continuous system for producing a laminate according to the invention.

A slurry of silicon and flux powders is then deposited by the depositing device 14, which in one alternative may be a silk screen printer which deposits the slurry onto the roughened surface; or in the second alternative by a roller coater onto the embossed surface. The deposited slurry is dried as the substrate 10 passes through dryer 15 and next the substrate is combined with a covering aluminum layer 16 which is being uncoiled from roll 17. This is accomplished by means of pinch rolls 18 and the composite of the substrate 10 and covering aluminum layer 16 is then roll bonded in rolling mill 19. The bonded laminate 20 is then recoiled onto roll 21.

Figure 2:
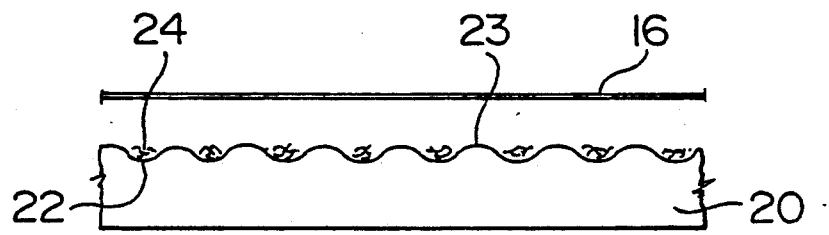
FIG. 2 is an exploded sectional view showing parts of the laminate before assembly.
Figure 3:
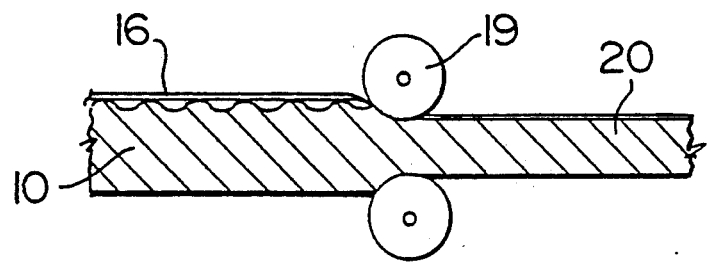
FIG. 3 is a sectional view showing details of the roll bonding procedure.

Details of one useful embossing pattern is shown in FIG. 2 with a series of embossed depressions 22 and lands 23. The depressions 22 receive a mixture of silicon and flux powder 24. The covering aluminum layer is then placed on top of the lands 23 as shown in FIGS. 1 and 3 and this composite is then subjected to roll bonding by means of rolls 19 with reduction to form the laminated assembly 20.

Figure 4:
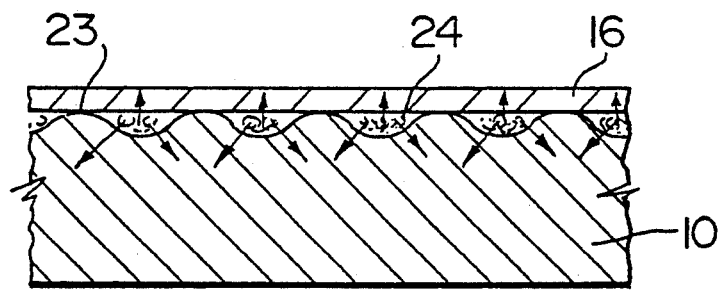
FIG. 4 is a schematic sectional view of the laminate during brazing.

As shown in FIG. 4, during the brazing process, the silicon/flux mixture 24 deposited in the depressions 22 react with both the covering aluminum layer 16 and the top portion of the substrate 10 to form a eutectic liquid during brazing. Thus, the entire upper region of the laminate including the covering aluminum layer, silicon/flux mixture and the top portion of the substrate 10 form the eutectic liquid which bonds to a second article.

DESCRIPTION OF THE PREFERRED EMBODIMENTS

The following examples are offered for purposes of illustration only, and are intended neither to define nor limit the invention in any manner.

EXAMPLE 1

Specimens of AA1100 foil (0.025 mm thickness) and AA3003 sheet (2.6 mm thickness) in the annealed or "0"-temper condition were cleaned for approximately 10 seconds in a caustic etch solution (5 wt. % NaOH), rinsed in deionized water desmutted by dipping for a few seconds in a 50 wt. % $HNO_3$ bath, water rinsed again and air blow off dried. The sheet specimen was then weighed and a water slurry containing Si and NOCOLOK ™ powders in a weight ratio of 1:2 was spread over one surface as a uniform coating. The specimen was subsequently dried for 5 minutes in an air furnace at a temperature of 150° C. and reweighed to evaluate the surface coverage by the residual Si/flux coating. The foil was bonded to the coated sheet surface by hot-rolling using the following procedure.

The foil was first attached to the coated AA3003 specimen by folding over one edge of the sheet and the metal sandwich was heated for one hour at a temperature of 300° C., 400° C. or 500° C. Immediately following the heating, the assembly was hot-rolled in a single pass with a reduction of approximately 50% using a small quantity of lubricant sprayed over the rolls. Hot-rolling was performed by feeding into the roll-bite the edge of the sheet to which the foil had been loosely attached. This procedure yielded a good bond at the leading edge of the metal laminate and prevented unwanted lateral displacements of the foil across the sheet surface during rolling. Because adhesion of the foil to the sheet (through the powder coating) was found to increase with additional cold-rolling, cold-rolling was carried out 1 to 3 times, each time with a reduction of approximately 50%, after the hot-rolled assembly had cooled to room temperature. Finally, the effect on adhesion of annealing the cold-rolled laminate at 300° C. for one hour was also assessed.

The adhesion strength of the foil to the coated sheet was evaluated qualitatively by means of a conventional adhesive tape pull-test. Adhesion was evaluated by determining the area of foil lifted off the laminate ($A_l$) by the tape and calculating the quantity $(A-A_l)/A$, where A is the area initially covered by the tape. The brazing performance of the laminate was also evaluated with a V-shaped strip of AA1100 aluminum alloy located on the foil side of the laminate and heating to approximately 600° C. in a nitrogen quartz-tube furnace. The results of these evaluations for a range of laminate preparation conditions are shown in Table 1.

TABLE 1

| Si + flux loading (g/m$^2$) | Hot-rolling temperature (°C.) | Hot-rolling reduction (%) | Cold-rolling reduction (%) | Did the laminate braze? | Adhesion (%) A.R.* | Adhesion (%) Ann.+ |
|---|---|---|---|---|---|---|
| 45.5 | 300 | 47 | 0 | yes | 0 | — |
| 45.5 | 300 | 47 | 44 | yes | 84 | 92 |
| 45.5 | 300 | 47 | 69** | yes | 65 | 95 |
| 32.9 | 400 | 46 | 0 | yes | 0 | — |
| 32.9 | 400 | 46 | 45 | yes | 84 | 92 |
| 32.9 | 400 | 46 | 67** | yes | 20 | 88 |
| 30.0 | 500 | 47 | 0 | no | — | |
| 30.0 | 500 | 47 | 43 | no | 3 | 97 |
| 30.0 | 500 | 47 | 68** | no | 10 | 74 |

*As-Rolled
+Annealed after cold-rolling
**After 3 cold-rolling passes

From the above table it can be seen that cold rolling, following hot rolling at 300° to 400° C. improves adhesion significantly. It can also be seen that annealing of the cold-rolled laminate leads to increased adhesion and that there is a deleterious effect by hot rolling at 500° C. on the brazing and adhesion properties of the bonded laminate.

EXAMPLE 2

The experiments described in Example 1 were repeated using an AA1100 foil with a thickness of 0.094 mm in the "0"-temper condition. All other experimental conditions were identical to those of Example 1 and the results are shown in Table 2 below:

TABLE 2

| Si + flux loading (g/m$^2$) | Hot-rolling temperature (°C.) | Hot-rolling reduction (%) | Cold-rolling reduction (%) | Did the laminate braze? | Adhesion (%) A.R.* | Adhesion (%) Ann.+ |
|---|---|---|---|---|---|---|
| 57.6 | 300 | 45 | 0 | yes | 0 | 3 |
| 57.6 | 300 | 45 | 48 | yes | 77 | 84 |
| 57.6 | 300 | 45 | 69** | yes | 92 | 97 |
| 62.0 | 400 | 46 | 0 | yes | 0 | 0 |
| 62.0 | 400 | 46 | 45** | yes | 40 | 100 |
| 62.0 | 400 | 46 | 67** | yes | 99 | 100 |
| 62.0 | 500 | 47 | 0 | yes | 0 | 0 |
| 62.0 | 500 | 47 | 48 | yes | 0 | 100 |
| 62.0 | 500 | 47 | 68** | yes | 75 | 80 |

*As-Rolled
+Annealed after cold-rolling
**After 3 cold-rolling passes

As in Example 1, there was an improvement in adhesion properties provided by cold-rolling the laminate after hot-rolling. This data also indicates that an increase in foil thickness improves foil adhesion to the coated alloy core.

EXAMPLE 3

The experiments described in Example 1 were repeated using an AA1100 foil with a thickness of 0.025 mm and an AA1100 substrate sheet having a thickness of 2.8 mm. All materials were prepared in the "0"-temper condition and coated with Si/flux. The results are shown in Table 3 below:

TABLE 3

| Si + flux loading (g/m$^2$) | Hot-rolling temperature (°C.) | Hot-rolling reduction (%) | Cold-rolling reduction (%) | Did the laminate braze? | Adhesion (%) A.R.* | Adhesion (%) Ann.+ |
|---|---|---|---|---|---|---|
| 28.1 | 300 | 48 | 0 | yes | 26 | 53 |
| 28.1 | 300 | 48 | 47 | yes | 74 | 87 |
| 28.1 | 300 | 48 | 70** | yes | 85 | 97 |

TABLE 3-continued

| Si + flux loading (g/m²) | Hot-rolling temperature (°C.) | Hot-rolling reduction (%) | Cold-rolling reduction (%) | Did the laminate braze? | Adhesion (%) A.R.* | Adhesion (%) Ann.+ |
| --- | --- | --- | --- | --- | --- | --- |
| 29.1 | 400 | 49 | 0 | yes | 10 | 20 |
| 29.1 | 400 | 49 | 50** | no | 17 | 27 |
| 29.1 | 400 | 49 | 71** | no | 4 | 47 |
| 31.0 | 500 | 53 | 0 | no | 0 | 0 |
| 31.0 | 500 | 53 | 48 | no | 77 | 70 |
| 31.0 | 500 | 53 | 69** | no | 7 | 50 |

*As-Rolled
+Annealed after cold-rolling
**After 3 cold-rolling passes

It will be seen from Table 3 that mixed results were obtained with respect to foil adhesion and brazing. The use of a substrate softer than AA3003 yields some adhesion of the foil after hot rolling at 300° C. and 400° C., even without the cold rolling step. The lack of brazeability at 400° C. may be due to a lighter Si+flux loading than in Example 2.

EXAMPLE 4

The experiments of Example 3 were repeated using AA1100 foil with a thickness of 0.094 mm and all other experimental conditions were identical to those used in Example 3. The results obtained are shown in Table 4 below:

TABLE 4

| Si + flux loading (g/m²) | Hot-rolling temperature (°C.) | Hot-rolling reduction (%) | Cold-rolling reduction (%) | Did the laminate braze? | Adhesion (%) A.R.* | Adhesion (%) Ann.+ |
| --- | --- | --- | --- | --- | --- | --- |
| 63.5 | 300 | 48 | 0 | yes | 0 | 6 |
| 63.5 | 300 | 48 | 46 | yes | 0 | 0 |
| 63.5 | 300 | 48 | 70** | yes | 95 | 90 |
| 58.6 | 400 | 46 | 0 | yes | 80 | 90 |
| 58.6 | 400 | 46 | 51** | yes | 75 | 80 |
| 58.6 | 400 | 46 | 71** | yes | 72 | 88 |
| 51.3 | 500 | 48 | 0 | yes | 0 | 0 |
| 51.3 | 500 | 48 | 69** | yes | 74 | 74 |

*As-Rolled
+Annealed after cold-rolling
**After 3 cold-rolling passes

Overall, the use of heavier (Si+flux) coatings and of a foil thickness greater than in Example 3 have a beneficial effect on foil/core-sheet adhesion and on laminate brazability. This is consistent with the experiment trend observed between the results of Examples 1 and 2 using the AA1100/AA3003 system.

EXAMPLE 5

The procedure of Example 3 was repeated using a mixture of Si, Zn and flux powders in weight ratio of 1:0.4:2 respectively. The powder coating was applied as described earlier from a water-based slurry. The alloy system and the thickness of the foil and core sheet were identical to those in Example 3. The results are shown in Table 5 below:

TABLE 5

| Si + flux loading (g/m²) | Hot-rolling temperature (°C.) | Hot-rolling reduction (%) | Cold-rolling reduction (%) | Did the laminate braze? | Adhesion (%) A.R.* | Adhesion (%) Ann.+ |
| --- | --- | --- | --- | --- | --- | --- |
| 99.8 | 300 | 47 | 0 | no | 0 | 0 |
| 99.8 | 300 | 47 | 48 | yes | 92 | 87 |
| 99.8 | 300 | 47 | 70** | yes | 94 | 97 |
| 88.6 | 400 | 47 | 0 | no | 0 | 0 |
| 88.6 | 400 | 47 | 50** | yes | 98 | 94 |
| 88.6 | 400 | 47 | 70** | yes | 20 | 87 |
| 89.6 | 500 | 47 | 0 | no | 0 | 0 |
| 89.6 | 500 | 47 | 50 | yes | 25 | 77 |
| 89.6 | 500 | 47 | 70** | yes | 16 | 30 |

*As-Rolled
+Annealed after cold-rolling
**After 3 cold-rolling passes

The above results reveal that good foil adhesion and good brazing performance are possible in the presence of Zn powder. A decrease in adhesion with increasing hot-rolling temperature was also noted.

EXAMPLE 6

The procedure of Example 3 was repeated using a mixture of Si, Al and flux powders in the weight ratio of 1:0.1:3 respectively. The powder mixture was applied from a water-based slurry. The quantity of flux used in the powder mixture was relatively large to allow dissolution of surface oxide films on the Al powder particles and conversion of this aluminum, along with the foil material, to Si/Al eutectic liquid. The results are shown in Table 6 below:

TABLE 6

| Si + flux loading (g/m²) | Hot-rolling temperature (°C.) | Hot-rolling reduction (%) | Cold-rolling reduction (%) | Did the laminate braze? | Adhesion (%) A.R.* | Adhesion (%) Ann.+ |
|---|---|---|---|---|---|---|
| 42.1 | 300 | 47 | 0 | — | — | — |
| 42.1 | 300 | 47 | 48 | yes | 24 | 97 |
| 42.1 | 300 | 47 | 70** | yes | 77 | 94 |
| 39.7 | 400 | 47 | 0 | — | — | — |
| 39.7 | 400 | 47 | 50** | yes | 80 | 87 |
| 39.7 | 400 | 47 | 70** | yes | 54 | 92 |
| 30.5 | 500 | 47 | 0 | — | — | — |
| 30.5 | 500 | 47 | 53 | yes | 1 | 54 |
| 30.5 | 500 | 47 | 72** | no | 17 | 13 |

*As-Rolled
+Annealed after cold-rolling
**After 3 cold-rolling passes

The above results reveal that it is possible to generate sufficient filler metal for brazing with aluminum powder in the brazing mixture. Again hot rolling at 500° C. showed a deleterious effect on foil adhesion and brazing.

EXAMPLE 7

The procedure of Example 3 was repeated in every respect except that the core alloy surface was engraved with a regular array of small depressions. This array was generated by mechanical embossing. The depression array was obtained first by embossing (by rolling) the pattern of a 24×24 mesh/linear inch steel screen into an aluminum template and then rolling this embossed pattern (the negative of the wire mesh) into the core alloy. The results obtained are shown in Table 7 below:

TABLE 7

| Si + flux loading (g/m²) | Hot-rolling temperature (°C.) | Hot-rolling reduction (%) | Cold-rolling reduction (%) | Did the laminate braze? | Adhesion (%) A.R.* | Adhesion (%) Ann.+ |
|---|---|---|---|---|---|---|
| 48.5 | 500 | 45 | — | — | — | — |
| 48.5 | 500 | 45 | 40 | — | 0 | 5 |
| 48.5 | 500 | 45 | 70** | — | 90 | 60 |
| 48.5 | 500 | 45 | 75** | yes | — | 100 |

*As-Rolled
+Annealed after cold-rolling
**After 3 cold-rolling passes

The above results indicate that use of the embossed pattern on the substrate surface acts to promote foil-/core adhesion.

EXAMPLE 8

The procedure of Example 3 was repeated in every respect except that hot-rolling was performed only at 300° C., the initial foil thickness was 0.097 mm and the core alloy surface was roughened by each of the following techniques: (a) wire-brushing longitudinally, (b) wire-brushing transversely, (c) wire-wheel brushing longitudinally, (d) wire-wheel brushing transversely, (e) grit-blasting and dimpling. In these techniques, "longitudinally" and "transversely" refers to the brushing direction with respect to the roll-lines on the core-sheet surface. Dimpling was carried out by mechanical embossing with a steel template. The dimples consisted of a square array of cylindrical projections ~152 μm height, ~0.8 mm in diameter and located approximately 1.5 mm apart.

The observations recorded to the various laminate preparation procedures are summarized in Table 8 below:

TABLE 8

| Surface roughening technique (rms roughness) | Si + flux loading (g/m²) | Hot-rolling reduction (%) | Cold-rolling reduction (%) | Did the laminate braze? | Adhesion (%) A.R.* | Adhesion (%) Ann.+ |
|---|---|---|---|---|---|---|
| wire-brush longitudinal | 82.8 | 48 | — | yes | 0 | |
| wire-brush longitudinal | 82.8 | 48 | 59 | yes | 80 | 80 |
| wire-brush longitudinal (avg. rms roughness = 2.9 μm) | 82.8 | 48 | 69 | yes | 83 | 80 |
| wire-brush transverse | 87.2 | 49 | — | yes | 0 | 0 |
| wire-brush transverse | 87.2 | 49 | 60 | yes | 87 | 87 |
| wire-brush transverse (avg. rms roughness = 2.7 μm) | 87.2 | 49 | 69 | yes | 87 | 93 |
| wire-wheel longitudinal | 89.1 | 49 | — | yes | 0 | 0 |
| wire-wheel longitudinal | 89.1 | 49 | 45 | yes | 80 | 80 |
| wire-wheel longitudinal (avg. rms roughness = 3.9 μm) | 89.1 | 49 | 60 | yes | 87 | 87 |
| wire-wheel transverse | 73.6 | 48 | — | yes | 0 | 0 |
| wire-wheel transverse | 73.6 | 48 | 60 | yes | 80 | 80 |
| wire-wheel transverse (avg. rms roughness = 3.8 μm) | 73.6 | 48 | 69 | yes | 83 | 83 |

TABLE 8-continued

| Surface roughening technique (rms roughness) | Si + flux loading (g/m²) | Hot-rolling reduction (%) | Cold-rolling reduction (%) | Did the laminate braze? | Adhesion (%) A.R.* | Adhesion (%) Ann.+ |
|---|---|---|---|---|---|---|
| grit-blast | 89.1 | 48 | — | yes | 0 | 0 |
| grit-blast | 89.1 | 48 | 60 | yes | 100 | 100 |
| grit-blast | 89.1 | 48 | 69 | yes | 87 | 83 |
| (avg. rms roughness = 10.2 μm) | | | | | | |
| dimpling | 120.8 | 50 | — | yes | 0 | 62 |
| dimpling | 120.8 | 50 | 46 | yes | 83 | 83 |
| dimpling | 120.8 | 50 | 60 | yes | 87 | 80 |
| (avg. dimple height 152 μm) | | | | | | |

*As-Rolled
+Annealed after cold-rolling

The above results indicate that roughening or dimpling of the core-alloy surface acts to promote foil/core adhesion. A comparison of Table 8 with Tables 1–7 reveals that core-sheet roughening leads to an increase in foil adhesion (after processing by a single hot-rolling pass followed by one additional cold-roll pass) over the adhesion obtained in the absence of surface roughening following the identical processing path. In addition, adhesion is not increased by annealing the cold-rolled laminate.

EXAMPLE 9

This example illustrates the brazing capabilities of the brazing laminate with metals other than aluminum. Brazing tests were performed on coupons of laminated material approximately 2.5 cm × 3.2 cm × 0.77 cm and prepared as described in Example 8 with the core alloy surface wire-brushed transversely to the rolling direction. The coupons were swabbed with acetone and then wiped dry. A strip of a selected metal other than aluminum was then chemically cleaned and located edge-on on the coupon. The strip materials tested consisted of copper, stainless steel and mild steel. The cleaning procedures for the strips are listed in Table 9. The strip was approximately 2 cm in length, 3 mm in width and 0.5 to 1 mm in thickness, and was bent into a V-shape so it could rest on the brazing coupon edge-on. The assembly was then located in a quartz-tube nitrogen furnace at 605° C. and heated for a few minutes.

TABLE 9

| Strip material | Strip cleaning | Strip thickness | Did brazing occur? |
|---|---|---|---|
| copper | 30 sec. in HNO₃ solution, cold-water rinse and dried | 0.58 | yes |
| stainless steel | swabbed with acetone and dried | 0.66 | yes |
| mild steel | swabbed with acetone and dried | 1.1 | yes |

As indicated in the above table, a metallurgical bond was obtained in all the tests carried out.

EXAMPLE 10

Zinc powder was rolled in at a concentration of 50 g/m² on the surface of AA1100 aluminum at a temperature of 400°–450° C. The zinc powder had particulate dimensions of about 10 microns. The rolling was performed at a reduction of about 50%. The zinc particles tended to agglomerate and generate an incoherent rolled in layer with a maximum thickness of about 17 microns.

EXAMPLE 11

Silicon powder, with a particle-size distribution ranging from <1 μm to ~80 μm, was imbedded into the surface of a sheet of AA1100 alloy by hot-rolling. Rolling was carried out at a temperature of 450° C. and at a reduction of 50%. The average surface coverage by rolled-in Si was approximately 96 g/m². The brazeability of the surface carrying the rolled-in Si was tested by clamping to it a V-shaped strip (9 mm × 9 cm × 1 mm) of bare AA1100 alloy edge-on and heating in a nitrogen furnace to 600° C. for two minutes. No flux was used for generating the joint. The clamping force probably did not exceed a few kilograms. It was verified that the heating cycle yielded a metallurgical joint, consisting of an Al—Si alloy, between the V-shaped strip and the surface in which Si had been embedded.

EXAMPLE 12

This example illustrates how a self-brazing composite may be prepared without the use of a *separate* covering aluminum layer on top of the core sheet.

A specimen of AA1100 aluminum sheet approximately 2.4 mm thick was embossed with a series of parallel grooves by means of a specially-engraved steel forming-tool. Embossing was performed at a temperature of 500° C. The grooves generated in the aluminum surface were approximately 0.18 mm wide and 0.8 mm deep, and were located 0.57 mm apart. They were then filled to approximately ⅔ of their depth with a mixture of Si and flux powders with a Si:flux weight ratio of 1:2 and a surface-averaged coverage of 133 g/m². The composite material was then hot-rolled at 400° C. in a direction transverse to the groove direction. This procedure aimed to fold the upper part of the "walls" separating the grooves, thus providing a "lid" over the groove openings to entrap the brazing powder. Subsequent to this procedure, the brazing property of the rolled aluminum/brazing-powder surface was assessed by locating V-shaped thin aluminum strips on the said surface and heating for a few minutes at 605° C. in a nitrogen quartz-tube furnace as described in Example 1.

The results were as follows: rolling of the grooved surface led to folding of groove "walls" over the groove openings but also displaced some brazing powder out of the grooves. Thus some of the brazing powder remained entrapped in the "lidded" grooves while some was exposed directly to the roll surface and became embedded into the external aluminum surface i.e. the exposed "lid" surfaces during rolling. Although this yielded an uneven distribution of brazing powder on the core-sheet, a continuous fillet was formed around the V-shaped strip during brazing.

We claim:

1. A self-brazing aluminum laminated sheet structure comprising an aluminum or aluminum alloy substrate having bonded to at least one surface thereof a mixture of (i) particles of a metal capable of forming in situ a eutectic alloy with the substrate when the sheet is heated and (ii) particles of flux of melting point lower than the melting point of the eutectic and capable of removing an oxide layer from the surface of the substrate material, and an aluminum or aluminum alloy covering layer on top of said mixture of eutectic-forming metal and flux particles, said covering layer being bonded to the substrate such that the particles are encased between the covering layer and substrate, thereby protecting subsequent processing tools from damage by said metal particles.

2. A laminated sheet structure according to claim 1 which also includes between the substrate and covering metal layer particles of a second metal or ceramic capable of modifying the properties of the substrate or eutectic alloy formed in situ.

3. A laminated sheet structure according to claim 1 wherein the eutectic-forming metal particles are particles of Si, Cu, Ge or Zn.

4. A laminated sheet structure according to claim 3 wherein the eutectic-forming metal particles are silicon particles.

5. A laminated sheet structure according to claim 4 wherein the metal covering layer is an aluminum layer formed of commercially pure aluminum or an aluminum alloy containing less than 0.1% by weight of magnesium.

6. A laminated sheet structure according to claim 5 wherein the flux is a composition containing by weight 40 to 70% $AlF_3$ and 30 to 60% $KF$.

7. A laminated sheet structure according to claim 6 wherein the flux is potassium fluoroaluminate.

8. A laminated sheet structure according to claim 5 wherein the eutectic forming metal particles and flux particles form a layer on the substrate and the covering aluminum layer is roll-bonded to the substrate over a layer of particles.

9. A laminated sheet structure according to claim 8 wherein the eutectic-forming metal particles and flux particles are arranged in spaced clusters on the substrate and the covering metal layer is bonded to the substrate in the areas between the clusters.

10. A laminated sheet structure according to claim 11 wherein the clusters are located within depressions in the substrate surface.

11. A laminated sheet structure according to claim 8 wherein the covering aluminum layer is formed of commercially pure aluminum or an aluminum alloy containing magnesium such as to provide an amount of less than 0.1% by weight magnesium at the point of brazing at the time of brazing.

12. A laminated sheet structure according to claim 1 wherein said eutectic forming metal particles and flux are contained in the bottoms of grooves in a textured substrate with the regions of the substrate between the grooves having been compressed to cover and lock in the metal particles and flux.

13. A laminated sheet structure according to claim 5 wherein the silicon and flux are present in a Si:flux weight ratio range from 1:10 to 10:1.

14. A laminated sheet structure according to claim 13 wherein the silicon particles range in size from 1 to 1000 μm.

15. A laminated sheet structure according to claim 14 wherein the Si:flux weight ratio ranges from 1:1 to 1:4 and the silicon particles range in size from 10 to 60 μm.

16. A laminated sheet structure according to claim 1 wherein the mixture of eutectic forming metal particles and flux also includes a binder and the covering metal layer is fixed to the substrate in part by adhesion of the binder.

17. A process for producing a self-brazing aluminum laminated sheet structure which comprises (a) applying to at least one surface of an aluminum or aluminum alloy substrate a mixture of particles of a metal capable of forming in situ a eutectic alloy with the substrate when the sheet is heated and particles of flux are applied to the substrate surface, said flux having a melting point lower than the melting point of the eutectic and capable of removing an oxide layer from the surface of the substrate material, (b) placing a covering metal layer on top of the eutectic-forming metal particle and flux particles and (c) rolling the covering layer and substrate, whereby said covering layer is bonded to the substrate such that the metal particles are encased between the covering layer and substrate, thereby protecting subsequent processing tools from damage by said metal particles.

18. A process according to claim 17 wherein the metal layer is formed of commercially pure aluminum or an aluminum alloy containing magnesium such as to provide an amount of less than 0.1% by weight magnesium at the point of brazing at the time of brazing.

19. A process according to claim 18 wherein the roll bonding is a combination of hot and cold rolling.

20. A process according to claim 19 wherein the roll bonding comprises hot rolling with a reduction of 20 to 80% and a cold rolling with a reduction of 30 to 80%.

21. A process according to claim 19 wherein the eutectic-forming metal particles and flux particles are arranged in arrays of clustered particles with areas of bare metal surface between the clusters and the covering metal layer is directly roll bonded to the substrate in the areas between the clusters.

22. A process according to claim 21 wherein depressions are formed in the substrate or covering metal layer and the particle clusters are located in the depression.

23. A process according to claim 21 wherein the clusters of particles are formed by applying the particles by means of a silk screen process.

24. A process according to claim 17 wherein the substrate surface is textured to provide grooves, the eutectic forming metal particles and flux are deposited in the bottoms of the grooves and the substrate is rolled to flatten and laterally displace the regions of the substrate between the grooves to thereby cover and lock in the metal particles and flux.

25. A process according to claim 17 wherein the particles are rolled into the substrate surface by hot rolling.

26. A process according to claim 18 wherein the eutectic-forming metal is Si, Cu, Ge or Zn.

27. A process according to claim 17 wherein the mixture of eutectic forming metal particles and flux also includes a binder and the covering metal layer is fixed to the substrate in part by adhesion of the binder.

28. A method of brazing aluminum laminated sheet structure as claimed in claim 1 to another metallic part which comprises placing the parts in contact with each other and raising the temperature of the parts to a temperature higher than both the melting point of the flux and the eutectic-forming point of the eutectic-forming metal with aluminum to form a brazement.

29. A method of brazing the aluminum laminated sheet structure as claimed in claim 1 to another metallic part which comprises placing the parts in contact with each other and raising the temperature of the parts to a temperature higher than both the melting point of the flux and the eutectic-forming point of the eutectic-forming metal with aluminum whereby the flux in the laminate removes oxide layer from the covering metal layer surface in contact with the particles and allows conversion of the covering metal layer to the eutectic liquid by in situ diffusion of the eutectic-forming metal in the laminate into the metallic part, whereby a brazement is formed.

30. A method according to claim 29 wherein during heating at brazing temperature excess molten flux generated in the laminate flows through the eutectic liquid and dissolves the surface oxide film on the part being joined.

31. A brazed assembly whenever produced by the process of claim 28.

32. A brazed assembly whenever produced by the process of claim 29.

* * * * *